US012683743B2

(12) United States Patent
Amiri et al.

(10) Patent No.: US 12,683,743 B2
(45) Date of Patent: Jul. 14, 2026

(54) NON-CODEBOOK-BASED PRECODING BASED ON DOWNLINK CHANNEL PREDICTIONS

(71) Applicant: QUALCOMM Incorporated, San Diego, CA (US)

(72) Inventors: Roohollah Amiri, San Diego, CA (US); Srinivas Yerramalli, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 18/350,571

(22) Filed: Jul. 11, 2023

(65) Prior Publication Data

US 2025/0023692 A1     Jan. 16, 2025

(51) Int. Cl.
H04L 5/00          (2006.01)

(52) U.S. Cl.
CPC ............ H04L 5/0051 (2013.01); H04L 5/006 (2013.01)

(58) Field of Classification Search
CPC .............................. H04L 5/0051; H04L 5/006
See application file for complete search history.

(56) References Cited

U.S. PATENT DOCUMENTS

2023/0006789 A1     1/2023     Wang et al.
2023/0300806 A1*    9/2023     Haghighat ............ H04L 5/0048
                                                            370/329

2023/0336225 A1*   10/2023   Shahmohammadian ....................
                                                              H04L 5/005
2024/0113794 A1*    4/2024   Jeon ....................... H04L 1/0035
2025/0253998 A1*    8/2025   Katla ................ H04W 72/0446

FOREIGN PATENT DOCUMENTS

WO     WO-2023043578 A1     3/2023
WO     WO-2025000402 A1 *   1/2025   ............ H04W 72/21

OTHER PUBLICATIONS

International Search Report and Written Opinion—PCT/US2024/ 033281—ISA/EPO—Oct. 8, 2024.

* cited by examiner

*Primary Examiner* — Derrick V Rose

(57)          ABSTRACT

Methods, systems, and devices for wireless communications are described. A wireless communications system may support non-codebook-based precoding based on downlink channel predictions. A user equipment (UE) may receive control signaling indicating a channel state information (CSI) reference signal (CSI-RS) and a sounding reference signal (SRS) resource. The control signaling may instruct the UE to transmit an SRS via the SRS resource. The control signaling may indicate a differential value indicating a time after the SRS resource at which the UE is to predict CSI. The UE may receive, via the CSI-RS resource, a CSI-RS. The UE may transmit, via the SRS resource, the SRS that is precoded based on predicted CSI for a wireless channel resource that occurs in time after the SRS resource. The predicted CSI may be based on the CSI-RS.

28 Claims, 15 Drawing Sheets

810

820

815

805

800

130   105   115

Network
Entity

Transceiver   Antenna 1110   1115

Communications
Manager

Memory

Code

1130

1120   1125

1140

Processor

1135

1105

1100

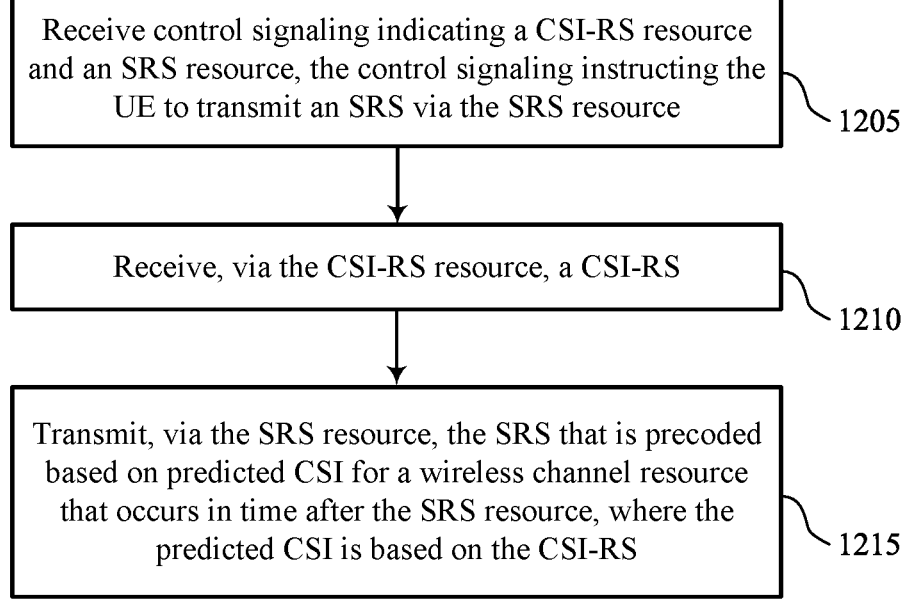

Receive control signaling indicating a CSI-RS resource and an SRS resource, the control signaling instructing the UE to transmit an SRS via the SRS resource

1205

Receive, via the CSI-RS resource, a CSI-RS

1210

Transmit, via the SRS resource, the SRS that is precoded based on predicted CSI for a wireless channel resource that occurs in time after the SRS resource, where the predicted CSI is based on the CSI-RS

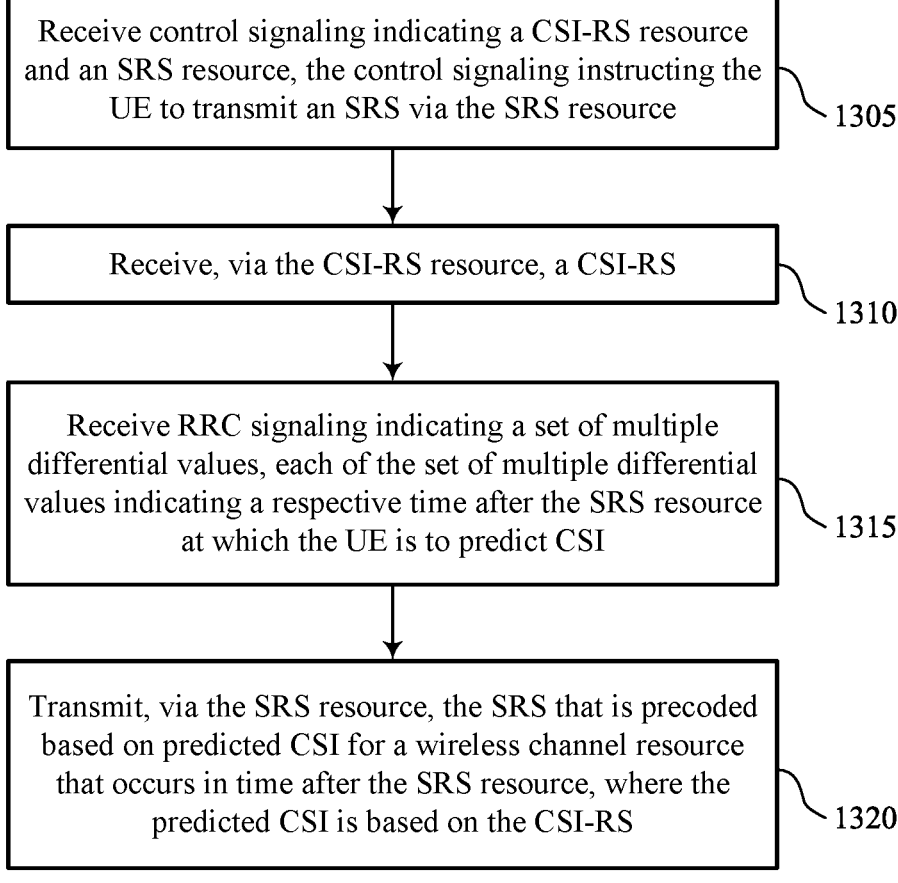

Receive control signaling indicating a CSI-RS resource and an SRS resource, the control signaling instructing the UE to transmit an SRS via the SRS resource

~ 1305

Receive, via the CSI-RS resource, a CSI-RS

~ 1310

Receive RRC signaling indicating a set of multiple differential values, each of the set of multiple differential values indicating a respective time after the SRS resource at which the UE is to predict CSI

~ 1315

Transmit, via the SRS resource, the SRS that is precoded based on predicted CSI for a wireless channel resource that occurs in time after the SRS resource, where the predicted CSI is based on the CSI-RS

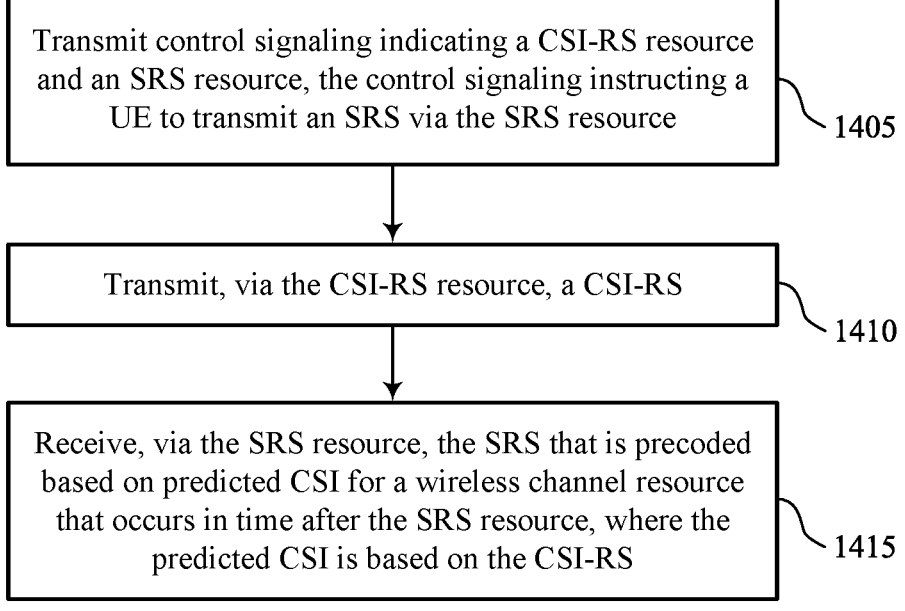

Transmit control signaling indicating a CSI-RS resource and an SRS resource, the control signaling instructing a UE to transmit an SRS via the SRS resource

1405

Transmit, via the CSI-RS resource, a CSI-RS

1410

Receive, via the SRS resource, the SRS that is precoded based on predicted CSI for a wireless channel resource that occurs in time after the SRS resource, where the predicted CSI is based on the CSI-RS

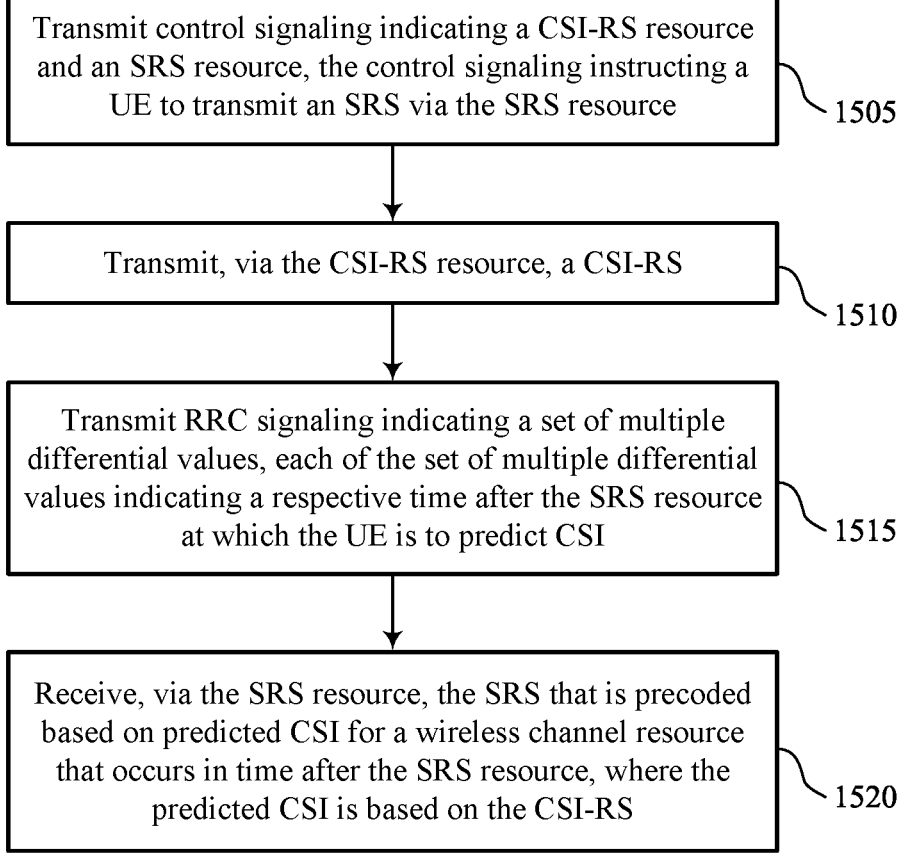

Transmit control signaling indicating a CSI-RS resource and an SRS resource, the control signaling instructing a UE to transmit an SRS via the SRS resource

1505

Transmit, via the CSI-RS resource, a CSI-RS

1510

Transmit RRC signaling indicating a set of multiple differential values, each of the set of multiple differential values indicating a respective time after the SRS resource at which the UE is to predict CSI

1515

Receive, via the SRS resource, the SRS that is precoded based on predicted CSI for a wireless channel resource that occurs in time after the SRS resource, where the predicted CSI is based on the CSI-RS

NON-CODEBOOK-BASED PRECODING BASED ON DOWNLINK CHANNEL PREDICTIONS

FIELD OF TECHNOLOGY

The following relates to wireless communications, including non-codebook-based precoding based on downlink channel predictions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may support codebook-based and non-codebook-based transmission schemes for physical uplink shared channel (PUSCH) transmissions. For non-codebook-based transmissions, the UE may transmit a set of sounding reference signals (SRSs), where each SRS is precoded with a respective set of UE-generated weights. A network entity (e.g., a base station) may evaluate each SRS and provide feedback to the UE about which weights the UE should apply for PUSCH transmissions. For non-codebook-based transmissions, the UE may assume channel reciprocity where the UE generates the uplink precoding weights based on downlink measurements.

SUMMARY

The described techniques relate to improved methods, systems, devices, and apparatuses that support non-codebook-based precoding based on downlink channel predictions. For example, the described techniques provide for a network entity to configure a user equipment (UE) to perform uplink precoding based on downlink predictions (e.g., instead of downlink measurements) for a non-codebook-based uplink transmission scheme. The UE may receive control signaling indicating a channel state information (CSI) reference signal (CSI-RS) resource and a sounding reference signal (SRS) resource. The control signaling may instruct the UE to transmit an SRS that is precoded based on predicted CSI (e.g., of a downlink channel). The CSI may be predicted for a wireless channel resource that occurs after the SRS resource in time (e.g., for a future wireless channel resource). The UE may receive a CSI-RS via the CSI-RS resource, and the UE may transmit the SRS via the SRS resource, where the UE may precode the SRS according to the predicted CSI.

A method for wireless communications by a UE is described. The method may include receiving control signaling indicating a CSI-RS resource and an SRS resource, the control signaling instructing the UE to transmit an SRS via the SRS resource, receiving, via the CSI-RS resource, a CSI-RS, and transmitting, via the SRS resource, the SRS that is precoded based on predicted CSI for a wireless channel resource that occurs in time after the SRS resource, where the predicted CSI is based on the CSI-RS.

A UE for wireless communications is described. The UE may include one or more memories storing processor-executable code, and one or more processors coupled with the one or more memories. The one or more processors may individually or collectively operable to execute the code to cause the UE to receive control signaling indicating a CSI-RS resource and an SRS resource, the control signaling instructing the UE to transmit an SRS via the SRS resource, receive, via the CSI-RS resource, a CSI-RS, and transmit, via the SRS resource, the SRS that is precoded based on predicted CSI for a wireless channel resource that occurs in time after the SRS resource, where the predicted CSI is based on the CSI-RS.

Another UE for wireless communications is described. The UE may include means for receiving control signaling indicating a CSI-RS resource and an SRS resource, the control signaling instructing the UE to transmit an SRS via the SRS resource, means for receiving, via the CSI-RS resource, a CSI-RS, and means for transmitting, via the SRS resource, the SRS that is precoded based on predicted CSI for a wireless channel resource that occurs in time after the SRS resource, where the predicted CSI is based on the CSI-RS.

A non-transitory computer-readable medium storing code for wireless communications is described. The code may include instructions executable by a processor to receive control signaling indicating a CSI-RS resource and an SRS resource, the control signaling instructing the UE to transmit an SRS via the SRS resource, receive, via the CSI-RS resource, a CSI-RS, and transmit, via the SRS resource, the SRS that is precoded based on predicted CSI for a wireless channel resource that occurs in time after the SRS resource, where the predicted CSI is based on the CSI-RS.

In some examples of the method, UEs, and non-transitory computer-readable medium described herein, the control signaling indicates a differential value indicating a time after the SRS resource at which the UE may be to predict CSI.

In some examples of the method, UEs, and non-transitory computer-readable medium described herein, receiving the control signaling may include operations, features, means, or instructions for receiving radio resource control (RRC) signaling indicating a set of multiple differential values, each of the set of multiple differential values indicating a respective time after the SRS resource at which the UE may be to predict CSI.

Some examples of the method, UEs, and non-transitory computer-readable medium described herein may further include operations, features, means, or instructions for receiving a medium access control (MAC) control element (MAC-CE) or downlink control information (DCI) indicating activation of one of the set of multiple differential values.

Some examples of the method, UEs, and non-transitory computer-readable medium described herein may further include operations, features, means, or instructions for receiving a request to indicate a capability of the UE to support CSI prediction and transmitting a capability message indicating the capability of the UE to support the CSI prediction based on the request.

In some examples of the method, UEs, and non-transitory computer-readable medium described herein, the capability message includes an indication of a maximum duration of time after the SRS resource at which the UE may be to predict CSI, a quantity of time durations for which the UE may be to predict the CSI, or any combination thereof.

In some examples of the method, UEs, and non-transitory computer-readable medium described herein, transmitting the SRS may include operations, features, means, or instructions for transmitting the SRS that may be precoded according to the predicted CSI that may be predicted at a first time after the SRS resource, and a second SRS that may be precoded according to the predicted CSI that may be predicted at a second time after the SRS resource.

Some examples of the method, UEs, and non-transitory computer-readable medium described herein may further include operations, features, means, or instructions for transmitting an indication of the first time and the second time after the SRS resource.

Some examples of the method, UEs, and non-transitory computer-readable medium described herein may further include operations, features, means, or instructions for transmitting a control message indicating one or more differential values, where each of the one or more differential values indicates a respective time after the SRS resource at which the UE may be to predict CSI and where each of the one or more differential values corresponds to a respective SRS.

In some examples of the method, UEs, and non-transitory computer-readable medium described herein, where the SRS may be precoded based on the predicted CSI corresponding to a time associated with the one or more differential values.

In some examples of the method, UEs, and non-transitory computer-readable medium described herein, the control signaling instructs the UE to precode the SRS based on the predicted CSI.

A method for wireless communications by a network entity is described. The method may include transmitting control signaling indicating a CSI-RS resource and an SRS resource, the control signaling instructing a UE to transmit an SRS via the SRS resource, transmitting, via the CSI-RS resource, a CSI-RS, and receiving, via the SRS resource, the SRS that is precoded based on predicted CSI for a wireless channel resource that occurs in time after the SRS resource, where the predicted CSI is based on the CSI-RS.

A network entity for wireless communications is described. The network entity may include one or more memories storing processor-executable code, and one or more processors coupled with the one or more memories. The one or more processors may individually or collectively operable to execute the code to cause the network entity to transmit control signaling indicating a CSI-RS resource and an SRS resource, the control signaling instructing a UE to transmit an SRS via the SRS resource, transmit, via the CSI-RS resource, a CSI-RS, and receive, via the SRS resource, the SRS that is precoded based on predicted CSI for a wireless channel resource that occurs in time after the SRS resource, where the predicted CSI is based on the CSI-RS.

Another network entity for wireless communications is described. The network entity may include means for transmitting control signaling indicating a CSI-RS resource and an SRS resource, the control signaling instructing a UE to transmit an SRS via the SRS resource, means for transmitting, via the CSI-RS resource, a CSI-RS, and means for receiving, via the SRS resource, the SRS that is precoded based on predicted CSI for a wireless channel resource that occurs in time after the SRS resource, where the predicted CSI is based on the CSI-RS.

A non-transitory computer-readable medium storing code for wireless communications is described. The code may include instructions executable by a processor to transmit control signaling indicating a CSI-RS resource and an SRS resource, the control signaling instructing a UE to transmit an SRS via the SRS resource, transmit, via the CSI-RS resource, a CSI-RS, and receive, via the SRS resource, the SRS that is precoded based on predicted CSI for a wireless channel resource that occurs in time after the SRS resource, where the predicted CSI is based on the CSI-RS.

In some examples of the method, network entities, and non-transitory computer-readable medium described herein, the control signaling indicates a differential value indicating a time after the SRS resource at which the UE may be to predict CSI.

In some examples of the method, network entities, and non-transitory computer-readable medium described herein, transmitting the control signaling may include operations, features, means, or instructions for transmitting RRC signaling indicating a set of multiple differential values, each of the set of multiple differential values indicating a respective time after the SRS resource at which the UE may be to predict CSI.

Some examples of the method, network entities, and non-transitory computer-readable medium described herein may further include operations, features, means, or instructions for transmitting a MAC-CE or DCI indicating activation of one of the set of multiple differential values.

Some examples of the method, network entities, and non-transitory computer-readable medium described herein may further include operations, features, means, or instructions for transmitting a request to indicate a capability of the UE to support CSI prediction and receiving a capability message indicating the capability of the UE to support the CSI prediction based on the request.

In some examples of the method, network entities, and non-transitory computer-readable medium described herein, the capability message includes an indication of a maximum duration of time after the SRS resource at which the UE may be to predict CSI, a quantity of time durations at which the UE may be to predict the CSI, or any combination thereof.

In some examples of the method, network entities, and non-transitory computer-readable medium described herein, receiving the SRS may include operations, features, means, or instructions for receiving the SRS that may be precoded according to the predicted CSI that may be predicted at a first time after the SRS resource, and a second SRS that may be precoded according to the predicted CSI that may be predicted at a second time after the SRS resource.

Some examples of the method, network entities, and non-transitory computer-readable medium described herein may further include operations, features, means, or instructions for receiving an indication of the first time and the second time after the SRS resource at which CSI may be predicted.

Some examples of the method, network entities, and non-transitory computer-readable medium described herein may further include operations, features, means, or instructions for receiving a control message indicating one or more differential values, where each of the one or more differential values indicates a respective time after the SRS resource at which the UE may be to predict CSI and where each for the one or more differential values corresponds to a respective SRS.

In some examples of the method, network entities, and non-transitory computer-readable medium described herein, where the SRS may be precoded based on the predicted CSI corresponding to a time associated with the one or more differential values.

In some examples of the method, network entities, and non-transitory computer-readable medium described herein, the control signaling instructs the UE to precode the SRS based on the predicted CSI.

BRIEF DESCRIPTION OF THE DRAWINGS

FIGS. 12 through 15 show flowcharts illustrating methods that support non-codebook-based precoding based on downlink channel predictions in accordance with one or more aspects of the present disclosure.

DETAILED DESCRIPTION

Figure 1:
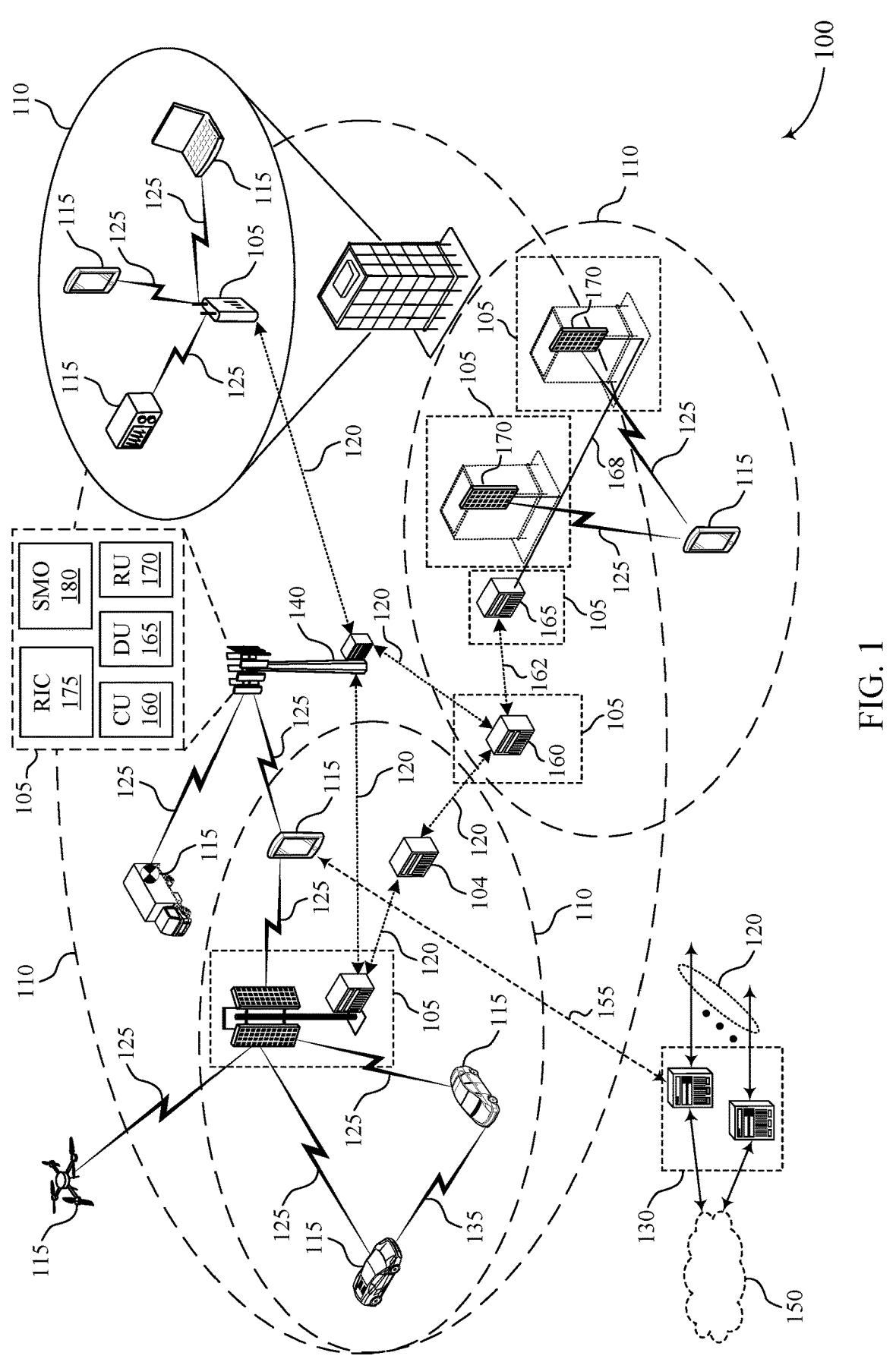
FIG. 1 shows an example of a wireless communications system that supports non-codebook-based precoding based on downlink channel predictions in accordance with one or more aspects of the present disclosure.

Wireless communications systems may support communications between a user equipment (UE) and a network entity. A UE may support codebook-based and non-codebook-based transmission schemes for physical uplink shared channel (PUSCH) transmissions. For non-codebook-based transmissions, the UE may transmit a set of sounding reference signals (SRSs), where each SRS may be precoded with a respective set of UE-generated weights. A network entity (e.g., a base station) may evaluate each SRS and provide feedback to the UE about which weights the UE should apply for PUSCH transmissions. For non-codebook-based transmissions, the UE may assume channel reciprocity where the UE generates the uplink precoding weights based on downlink measurements. However, the UE may benefit from using a predicted channel instead of a most recently-measured channel to calculate the precoder weights. Specifically, this may be relevant since the scheduling of resources may happen after an SRS transmission, while the channel estimated by the network entity may be outdated due to a change in channel conditions since the estimate. Thus, SRS precoding based on a predicted channel may result in improved communication throughout and reduced retransmissions due to avoiding use of outdated channel estimates for precoding.

In some implementations, a network entity may configure a UE to perform uplink precoding based on predictions for an upcoming downlink channel (e.g., instead of downlink measurements) for a non-codebook-based uplink transmission scheme. The UE may receive control signaling indicating a channel state information (CSI) reference signal (CSI-RS) resource and an SRS resource. The control signaling may instruct the UE to transmit an SRS that is precoded based on predicted CSI for a future downlink channel. The CSI may be predicted for a wireless channel resource that occurs after the SRS resource in time. The UE may receive a CSI-RS via the CSI-RS resource, and the UE may transmit the SRS via the SRS resource, where the SRS is precoded according to the predicted CSI.

Aspects described in this disclosure may be implemented to realize one or more of the following potential benefits. For example, the UE supporting uplink precoding based on a prediction for a future downlink channel, instead of solely using a downlink measurement, may improve channel estimation accuracy, improve spectral efficiency, and increase signaling throughput. In addition, when compared with precoding an SRS using measured CSI, precoding an SRS based on predicted CSI (e.g., channel measurements for future channel resources) may result in reduced latency and improved communications between the UE and the network entity.

Aspects of the disclosure are initially described in the context of wireless communications systems. Aspects of the disclosure are then described in the context of a prediction timeline and a process flow. Aspects of the disclosure are further illustrated by and described with reference to apparatus diagrams, system diagrams, and flowcharts that relate to non-codebook-based precoding based on downlink channel predictions.

FIG. 1 shows an example of a wireless communications system 100 that supports non-codebook-based precoding based on downlink channel predictions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support non-codebook-based precoding based on downlink channel predictions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support communications between a UE 115 and a network entity 105. The UE 115 may support non-codebook-based or codebook-based transmission schemes for PUSCH transmissions. For non-codebook-based transmissions, the UE 115 may transmit a set of SRSs, where each SRS may be precoded with a respective set of weights generated by the UE 115. The network entity 105 may evaluate each SRS and provide feedback to the UE 115 about which weights the UE 115 should apply for PUSCH transmissions. For non-codebook-based transmissions, the UE 115 may assume channel reciprocity where the UE 115 generates the uplink precoding weights based on downlink measurements. However, the UE 115 may benefit from using a predicted channel instead of a most recently-measured channel to calculate the precoder weights. Specifically, this may be relevant since the scheduling of resources may happen after an SRS transmission, while the channel estimated by the network entity 105 may be old (e.g., outdated, which may result in an inaccurate precoding). Thus, SRS precoding based on a predicted channel may improve the channel estimated at the network entity 105.

The wireless communications system 100 may support non-codebook-based precoding based on downlink channel predictions. In some implementations, a network entity 105 may configure a UE 115 to perform uplink precoding based on downlink predictions (e.g., instead of solely using downlink measurements) for a non-codebook-based uplink transmission scheme. The UE 115 may receive control signaling indicating a CSI-RS resource and an SRS resource. The control signaling may instruct the UE 115 to transmit an SRS that is precoded based on predicted CSI for a future downlink channel). The CSI may be predicted for a wireless channel resource that occurs after the SRS resource in time. That is, the CSI may be predicted for a future wireless channel resource rather than for a current resource. The UE 115 may receive a CSI-RS via the CSI-RS resource, and the UE 115 may transmit the SRS via the SRS resource, where the SRS may be precoded according to the predicted CSI. In this way, the precoding may be more accurate and updated for the scheduling of resources after SRS transmission, (e.g., when compared to using outdated measured CSI to precode the SRS).

Figure 2:
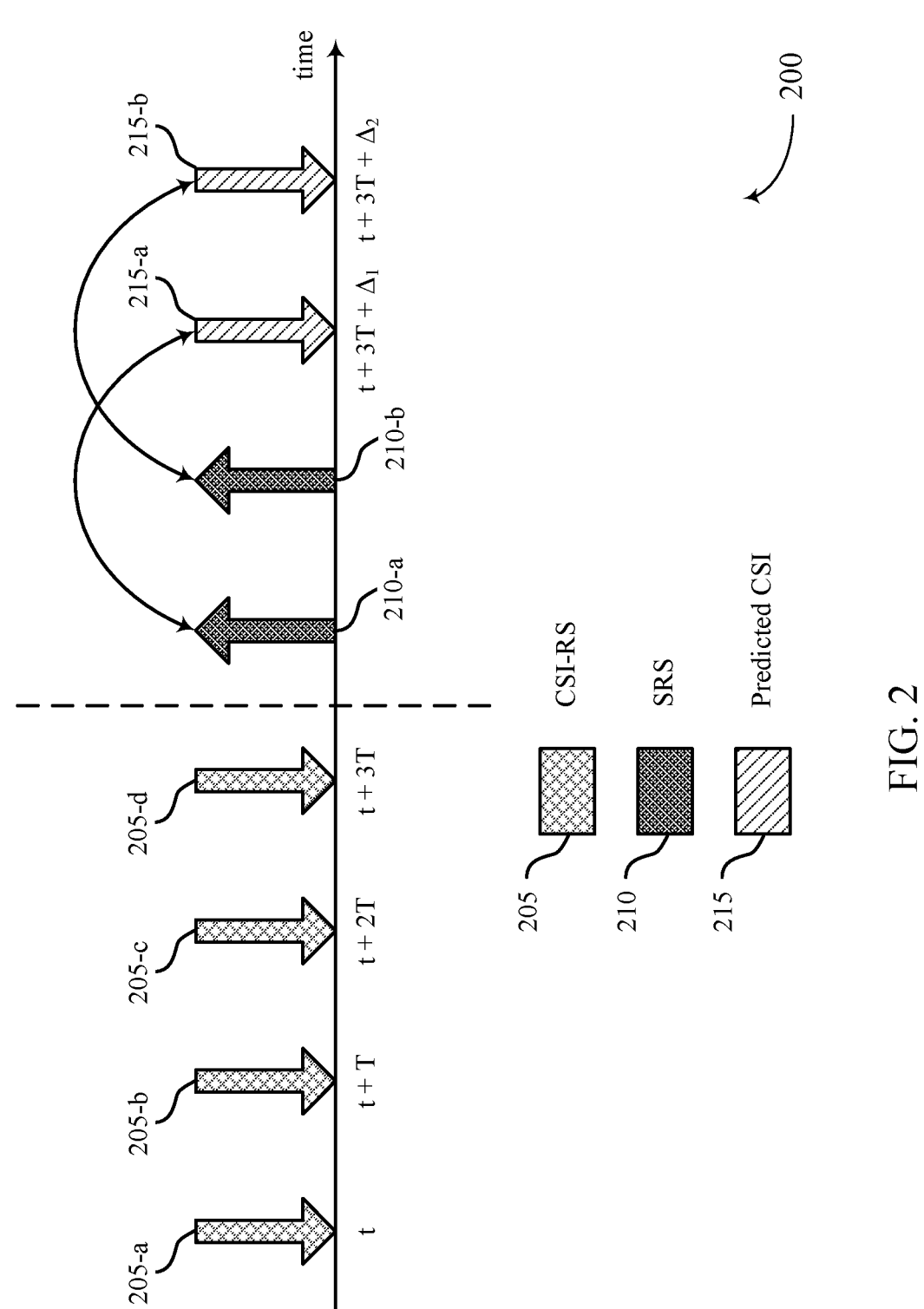
FIG. 2 shows an example of a prediction timeline that supports non-codebook-based precoding based on downlink channel predictions in accordance with one or more aspects of the present disclosure.

FIG. 2 shows an example of a prediction timeline 200 that supports non-codebook-based precoding based on downlink channel predictions in accordance with one or more aspects of the present disclosure. The prediction timeline 200 may depict the timing of uplink and downlink transmissions between a UE 115 and a network entity 105, which may be examples of corresponding devices described herein. For example, the prediction timeline 200 may illustrate one or more CSI-RSs 205 transmitted by the network entity 105 to the UE 115 for measurement by the UE 115, one or more SRSs 210 transmitted by the UE 115 to the network entity 105, and predicted CSI 215 (e.g., predicted CSI measurements based on CSI-RSs 205).

As described with reference to FIG. 1, a UE 115 and a network entity 105 may support a codebook-based transmission scheme or a non-codebook-based transmission scheme for PUSCH transmissions. The network entity 105 may configure the UE 115 for either codebook-based or non-codebook-based transmissions via a higher-layer parameter. In the case of non-codebook-based transmission, the UE 115 may transmit a set of SRSs, where the UE 115 may precode each SRS with a respective set of UE-generated weights. The network entity 105 may evaluate each SRS and provide feedback to the UE 115 about which weights to apply in PUSCH transmissions.

In a non-codebook-based transmission scheme, a UE 115 may support various methods to select precoders for transmission of SRS resources. In some examples, the UE 115 may receive downlink control information (DCI) including a field that sets rank and precoding matrices as SRS resource indicators (SRIs). One or two SRS resource sets may be configured via a higher-layer parameter. When two SRS resource sets are configured, one or two SRIs are given by the DCI fields of two SRS resource indicators. Each of the indicated one or two SRIs in slot n may be associated with the most recent transmission of SRS resources of the associated SRS resource set identified by the SRI, where the SRS transmission is prior to the physical downlink control channel (PDCCH) carrying the SRI. In some other examples, the network entity 105 may configure a synchronization signal block (SSB), CSI-RS, or SRS associated with an SRS resource, where the same spatial domain transmission filter used for the reception or transmission of the reference signal associated with the SRS resource may be used for transmitting the SRS resource. In some cases, the network entity 105 may configure an associated CSI-RS for a non-codebook SRS resource set, where the UE 115 may calculate the precoder used for the transmission of SRSs in the SRS resource set based on measurements of the configured non-zero power (NZP) CSI-RS resource.

In the present disclosure, an additional precoder selection option in a non-codebook-based transmission scheme is described, where the network entity 105 may configure the UE 115 to use a precoder based on predicted downlink channel information (e.g., rather than based on measured DCI). This is relevant since the scheduling of resources may happen at a time after the SRS transmission, while the estimated channel by the network entity 105 may be old (e.g., outdated, which may result in an inaccurate precoding).

As described herein with reference to FIG. 2, the network entity 105 may configure the UE 115 to transmit an SRS 210 based on a predicted channel. For example, the network entity 105 may transmit control signaling to the UE 115 indicating a CSI-RS resource and an SRS resource. The control signaling may instruct the UE to transmit an SRS via the SRS resource. In some examples, the control signaling may include an SRS resource set information element, which may indicate whether the UE 115 is to transmit the SRS 210 based on a predicted channel via a binary flag in an associated CSI-RS field. For example, the UE 115 may use the latest CSI measurement to calculate precoder weights if the binary flag is configured to '0,' or the UE 115 may use a predicted channel to calculate the precoder weights if the binary flag is configured to '1.'

In some examples, the network entity 105 may transmit a differential or delta value (e.g., $\Delta$) that indicates a time in the future after the SRS resource at which the UE 115 is to predict CSI (e.g., how far in the future the UE 115 may predict the downlink channel). In some cases, the network entity 105 may configure and transmit an RRC message with one or more differential values and may transmit a MAC control element (MAC-CE) or DCI to activate one of the differential values.

In some implementations, the network entity 105 may transmit, to the UE 115, a capability request message requesting the UE 115 to transmit a capability message. The UE 115 may transmit, to the network entity 105 (e.g., in response to the capability request message), a capability message that indicates a capability of the UE 115 to predict CSI 215. For example, the capability message may include an indication of a maximum differential or delta value (e.g., $\Delta_{max}$) up to which the UE 115 may make predictions. In some examples, the capability message may include an indication of quantity of preceding CSI-RSs 205 (e.g., a maximum length of CSI-RS history) that the UE 115 may use to predict the CSI 215.

As depicted in the prediction timeline 200 the network entity 105 may transmit, to the UE 115, a CSI-RS 205-a at time t, a CSI-RS 205-b at time t+T, a CSI-RS 205-c at time t+2T, and a CSI-RS 205-d at time t+3T. At a time between t+3T and t+3T+$\Delta_1$ (where $\Delta 1$ may represent a first differential value indicated by the network entity 105), the UE 115 may be scheduled to transmit an SRS 210-a via a corresponding SRS resource.

The UE 115 may receive one or more of the CSI-RSs 205 via respective CSI-RS resources, and the UE 115 may monitor the CSI-RSs 205 (the CSI transmissions via the CSI-RS resources) to generate corresponding CSI measurements. The UE 115 may use the CSI measurements to predict CSI 215 (e.g., CSI measurements) for a downlink resource or channel that occurs in the future (i.e., after the SRS transmission).

As configured by the network entity 105, the UE 115 may precode the SRS 210-a based on predicted CSI 215-a for a wireless channel resource that may occur in time after the SRS resource. For example, the UE 115 may precode the SRS 210-a based on the CSI 215-a predicted at time t+3T+$\Delta_1$, which may occur after the transmission of the SRS 210-a (e.g., instead of based on a previously or currently measured CSI-RS, such as a measurement of the CSI-RS 205-d at time t+3T). That is, the UE 115 may calculate the precoder (e.g., the precoder weights) for the SRS 210-a based on the predicted downlink channel associated with the predicted CSI 215-a. The UE 115 may predict the CSI 215-a based on the CSI-RSs 205-a, 205-b, 205-c, 205-d, or any combination thereof. The quantity of one or more preceding CSI-RSs 205 that the UE 115 may use to predict the CSI 215-a may be configured by the network entity 105, based on a prediction capability of the UE 115, or both.

In some implementations, the UE 115 may transmit more than one SRS 210, where each SRS 210 may be precoded based on respective CSI 215 predicted based on one or more of the CSI-RSs 205. For example, the UE 115 may precode the SRS 210-a according to the CSI 215-a at time t+3T+$\Delta_1$ (where $\Delta_1$ may represent a first differential value indicated by the network entity 105), and the UE 115 may precode an SRS 210-b according to CSI 215-b predicted at time t+3T+ $\Delta_2$ (where $\Delta_2$ may represent a second differential value indicated by the network entity 105). In some examples, the UE 115 may transmit, to the network entity 105, an indication of the differential value, the differential value indicating how far into the future the UE 115 may be capable of predicting CSI. For example, the UE 115 may transmit an indication that $\Delta_1$ is associated with SRS 210-a and that $\Delta_2$ is associated with SRS 210-b.

Additionally, or alternatively, the UE 115 may derive one or more differential values based on one or more times scheduled for one or more SRSs 210 transmissions (e.g., rather than receiving an indication of one or more differential values from the network entity 105). That is, the UE 115 may determine a location in time for each of the future downlink channels for which the UE 115 may generate CSI predictions relative to when the UE 115 may be scheduled to transmit a PUSCH transmission. In such cases, the UE 115 may calculate a precoder for each of the one or more SRSs 210 transmissions based on predicted CSI 215 at the one or more derived differential values.

In some examples, the UE 115 may transmit, to the network entity, a message indicating one or more differential values (e.g., A), to inform the network entity 105 how far into the future the UE 115 used to predict CSI. UE 115 may transmit the message via uplink control information (UCI) or via an uplink MAC-CE. Similar to implementations in which the UE 115 receives an indication of one or more differential values from the network entity 105, each of the one or more differential values may indicate a time in the future after transmission of an SRS 210 (e.g., a time in the future) at which the UE 115 may be capable of predicting CSI 215, where the UE 115 may predict the corresponding SRS 210 based on the predicted CSI 215 associated with the differential value. In some examples, the UE 115 may indicate one same differential value associated with each SRS 210 in a set of SRSs 210. In some other examples, the UE 115 may indicate multiple different differential values, one differential value associated with each SRS 210 in a set of SRSs 210.

Figure 3:
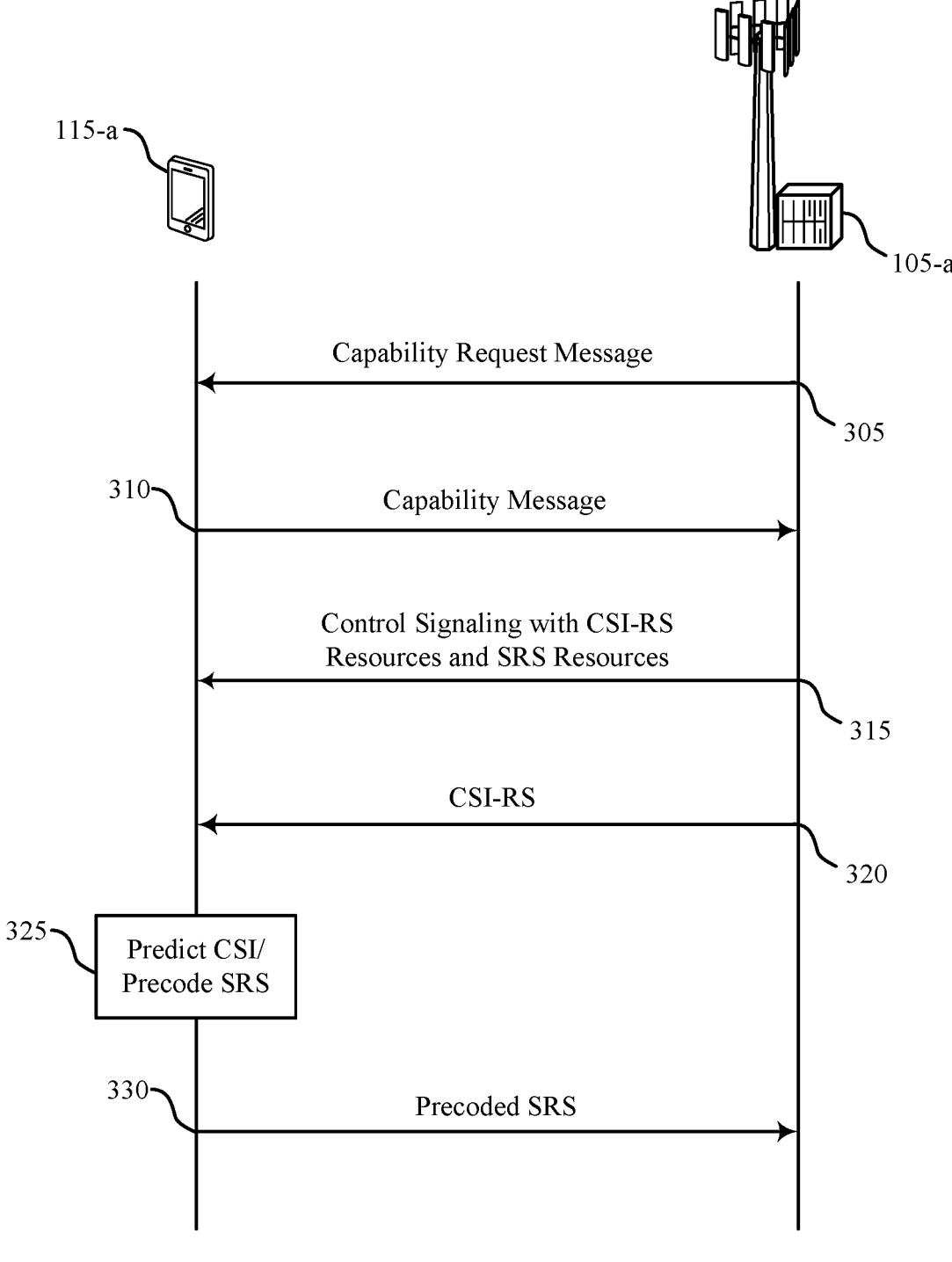
FIG. 3 shows an example of a process flow that supports non-codebook-based precoding based on downlink channel predictions in accordance with one or more aspects of the present disclosure.

FIG. 3 shows an example of a process flow 300 that supports non-codebook-based precoding based on downlink channel predictions in accordance with one or more aspects of the present disclosure. In some examples, the process flow 300 may implement or be implemented by aspects of the wireless communications system 100, the prediction timeline 200, or both. For example, the process flow 300 may include a UE 115-*a* and a network entity 105-*a*, which may be examples of corresponding devices described herein with respect to FIG. 1. Following the process flow 300, the network entity 105-*a* may configure the UE 115-*a* to perform uplink precoding based on downlink predictions (e.g., instead of downlink measurements) for a non-codebook-based uplink transmission scheme. Alternative examples of the following may be implemented, where some steps are performed in a different order than described or are not performed at all. In some cases, steps may include additional features not mentioned below, or further steps may be added. Although the UE 115-*a* and the network entity 105-*a* are shown performing the operations of the process flow 300, some aspects of some operations may also be performed by one or more other wireless devices.

At 305, the network entity 105-*a* may transmit, to the UE 115-*a*, a capability request message requesting the UE 115-*a* to indicate its capability to support CSI prediction. At 310, the UE 115-*a* may transmit, to the network entity 105-*a*, a capability message (e.g., in response to the capability request message received at 310) indicating the capability of the UE 115-*a* to support CSI prediction. For example, the capability message may include an indication of a maximum duration in the future after an SRS resource at which the UE is capable of predicting CSI, a quantity of future time durations for which the UE 115-*a* is capable of predicting CSI, or any combination thereof.

At 315, the network entity 105-*a* may transmit, to the UE 115-*a*, control signaling indicating a CSI resource and an SRS resource. In some examples, the control signaling may instruct the UE 115-*a* to transmit as SRS via the indicated SRS resource. In some instances, the control signaling may indicate a differential value that may indicate a time in the future that occurs after the SRS resource at which the UE

115-*a* is to predict CSI. In some examples, the control signaling may instruct the UE 115-*a* to precode the SRS based on predicted CSI (e.g., CSI predicted at the time indicated by the differential value, as described with reference to FIG. 2). The control signaling may include RRC signaling indicating a set of one or more differential values that each indicate one or more times in the future of one or more wireless channel resources (e.g., future downlink channel(s)) that each occur after the SRS resource at which the UE is to predict CSI, and a MAC-CE or DCI activating of one of the set of one or more differential values, to let the UE know which future time(s), and corresponding wireless channel resource(s), is to be used for generating the predicted CSI.

At 320, the network entity 105-*a* may transmit, to the UE 115-*a*, a CSI-RS via the CSI-RS resource indicated by the control signaling at 315. The UE 115-*a* may measure the CSI-RS, and may use the CSI-RS to predict a CSI for the wireless channel resource at a time in the future that occurs after the SRS resource indicated at 305 (e.g., as described with reference to FIG. 2).

At 325, the UE 115-*a* may predict CSI for the wireless channel resource that occurs in time after the SRS resource indicated by the control signaling at 305 (e.g., a future wireless channel resource). In some examples, the prediction may be for a time indicated by a differential value indicated by the control signaling at 315. In some examples, the UE 115-*a* may predict a first CSI for a first wireless channel resource at a first time after the SRS resource (e.g., indicated by a first differential value), and the UE 115-*a* may predict a second CSI for a second wireless channel resource at a second time after the SRS resource (e.g., indicated by a second differential value). In some implementations, the UE 115-*a* may precode an SRS according to the predicted CSI. For example, the UE 115-*a* may precode a first SRS according to the first CSI and precode a second SRS according to the second CSI.

At 330, the UE 115-*a* may transmit, to the network entity 105-*a*, the SRS precoded based on predicted CSI (e.g., via the SRS resource indicated by the control signaling at 305). In some examples, the UE 115-*a* may transmit the first SRS precoded according to the first CSI may transmit the second SRS precoded according to the second CSI (e.g., as described at 325). In such examples, the UE 115-*a* may additionally, or alternatively, transmit an indication of the first time and the second time after the SRS resource at which the first CSI and the second CSI were predicted. In some implementations, the UE 115-*a* may autonomously transmit, to the network entity 105-*a*, one or more SRSs precoded based on predicted CSI (e.g., not in response to control signaling indicating the UE 115-*a* to transmit an SRS). In such implementations, the UE 115-*a* may transmit, to the network entity 105-*a*, a control message indicating one or more differential or delta values (e.g., Δ). The one or more differential values may each correspond to a respective SRS and indicate a time in the future after the respective SRS resource at which the UE 115-*a* is to predict CSI, and may each be based on a time at which a transmission of the respective SRS is scheduled. In this way, the UE 115 may indicate the differential values such that network entity 105 knows how far in the future that the UE 115 may be capable of predicting the CSI, or how far into the future the wireless channel resource is that the UE 115 used to predict CSI. For example, the UE 115-*a* may autonomously transmit, to the network entity 105-*a*, one or more SRSs, each precoded based on the respective predicted CSI corresponding to one or more times associated with the one or more differential values.

Figure 4:
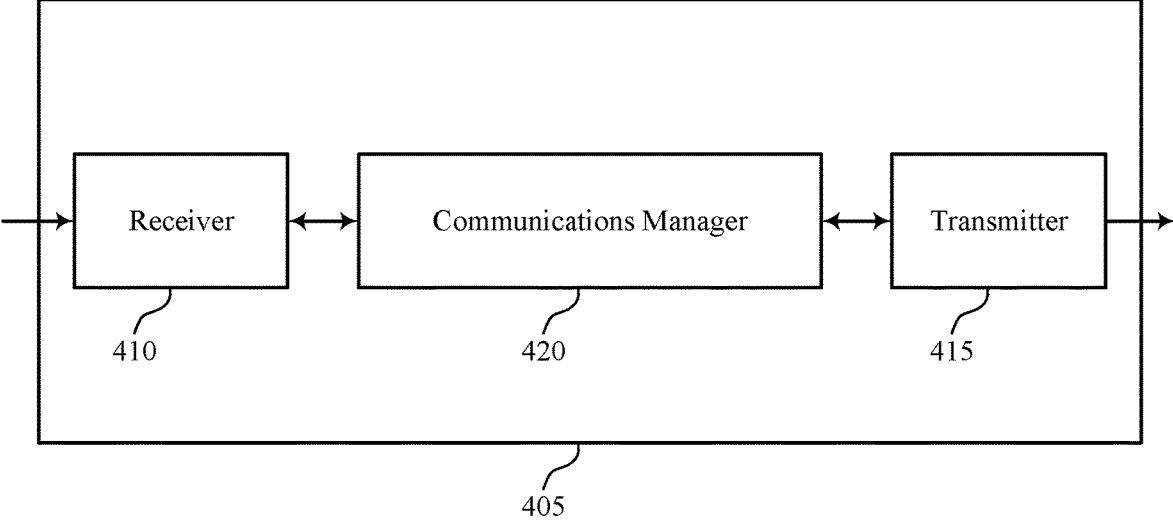
FIGS. 4 and 5 show block diagrams of devices that support non-codebook-based precoding based on downlink channel predictions in accordance with one or more aspects of the present disclosure.

FIG. 4 shows a block diagram 400 of a device 405 that supports non-codebook-based precoding based on downlink channel predictions in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to non-codebook-based precoding based on downlink channel predictions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to non-codebook-based precoding based on downlink channel predictions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of non-codebook-based precoding based on downlink channel predictions as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 is capable of, configured to, or operable to support a means for receiving control signaling indicating a CSI-RS resource and an SRS resource, the control signaling instructing the UE to transmit an SRS via the SRS resource. The communications manager 420 is capable of, configured to, or operable to support a means for receiving, via the CSI-RS resource, a CSI-RS. The communications manager 420 is capable of, configured to, or operable to support a means for transmitting, via the SRS resource, the SRS that is precoded based on predicted CSI for a wireless channel resource that occurs in time after the SRS resource, where the predicted CSI is based on the CSI-RS.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for non-codebook-based precoding based on downlink channel predictions, which may result in more efficient utilization of communication resources, improved accuracy of estimated channels, improved communications between wireless devices, and reduced latency.

Figure 5:
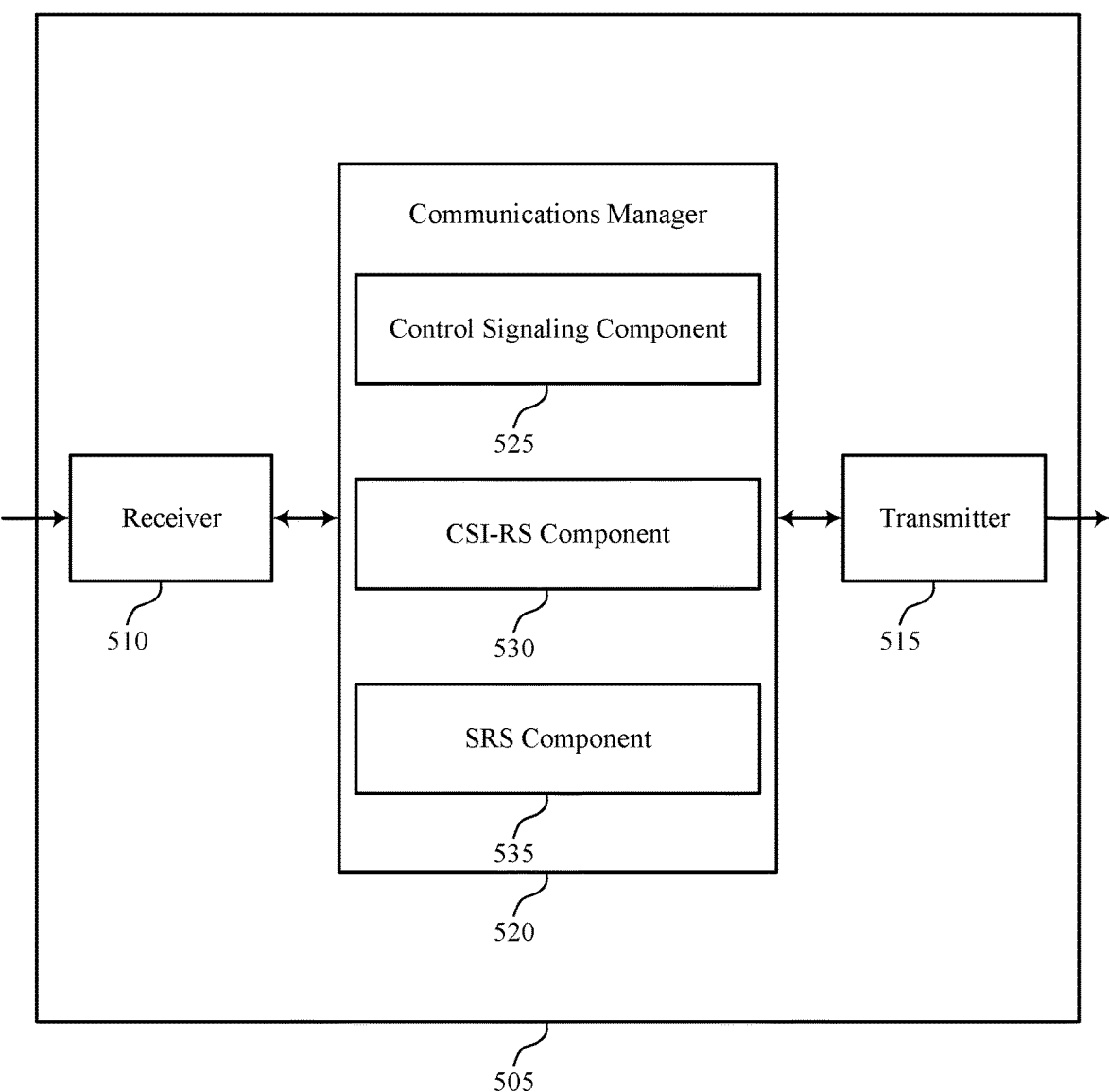

FIG. 5 shows a block diagram 500 of a device 505 that supports non-codebook-based precoding based on downlink channel predictions in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to non-codebook-based precoding based on downlink channel predictions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to non-codebook-based precoding based on downlink channel predictions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of non-codebook-based precoding based on downlink channel predictions as described herein. For example, the communications manager 520 may include a control signaling component 525, a CSI-RS component 530, an SRS component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The control signaling component 525 is capable of, configured to, or operable to support a means for receiving control signaling indicating a CSI-RS resource and an SRS resource, the control signaling instructing the UE to transmit an SRS via the SRS resource. The CSI-RS component 530 is capable of, configured to, or operable to support a means for receiving, via the CSI-RS resource, a CSI-RS. The SRS component 535 is capable of, configured to, or operable to support a means for transmitting, via the SRS resource, the SRS that is precoded based on predicted CSI for a wireless channel resource that occurs in time after the SRS resource, where the predicted CSI is based on the CSI-RS.

Figure 6:
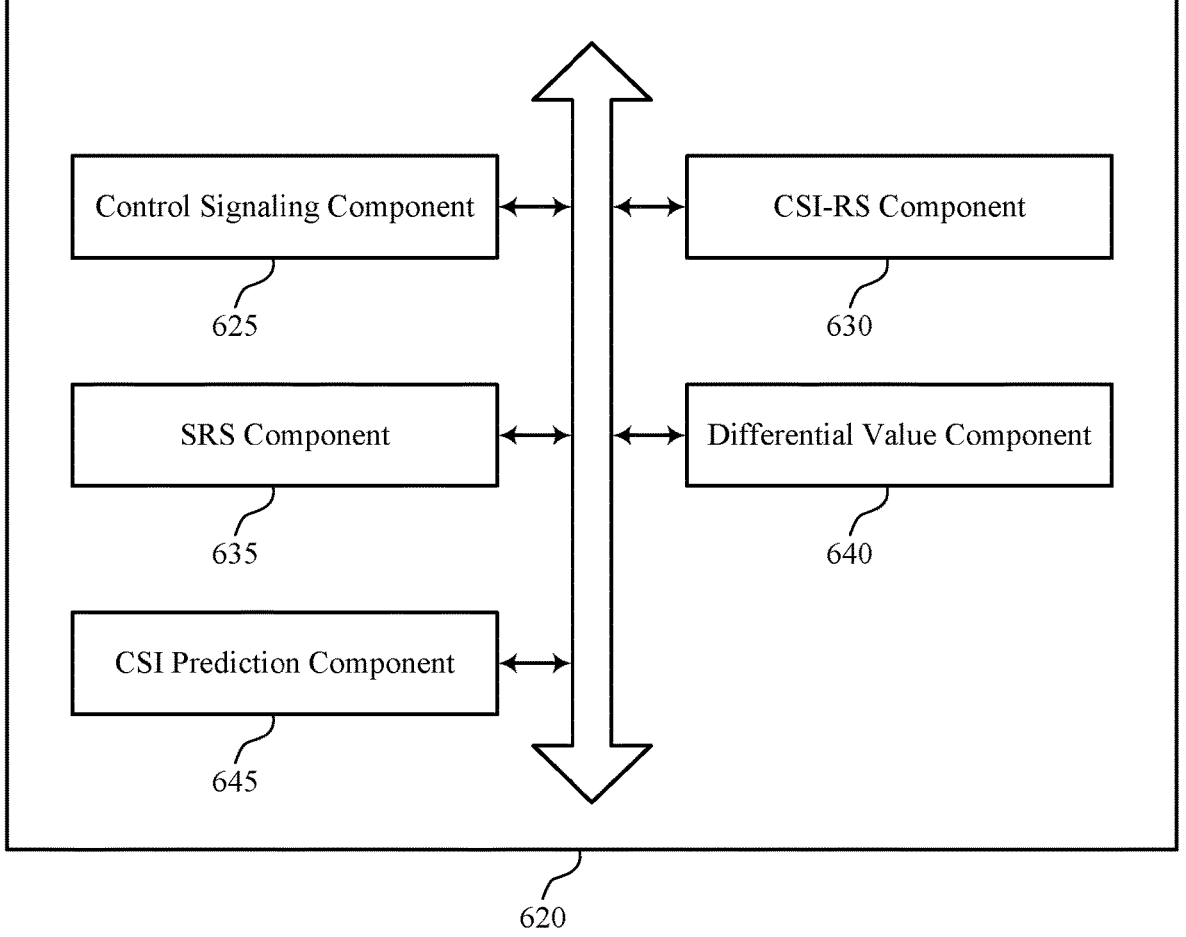
FIG. 6 shows a block diagram of a communications manager that supports non-codebook-based precoding based on downlink channel predictions in accordance with one or more aspects of the present disclosure.

FIG. 6 shows a block diagram 600 of a communications manager 620 that supports non-codebook-based precoding based on downlink channel predictions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of non-codebook-based precoding based on downlink channel predictions as described herein. For example, the communications manager 620 may include a control signaling component 625, a CSI-RS component 630, an SRS component 635, a CSI prediction component 640, a differential value component 645, or any combination thereof. Each of these components, or components or subcomponents thereof (e.g., one or more processors, one or more memories), may communicate, directly or indirectly, with one another (e.g., via one or more buses).

The communications manager 620 may support wireless communications at a UE in accordance with examples as disclosed herein. The control signaling component 625 is capable of, configured to, or operable to support a means for receiving control signaling indicating a CSI-RS resource and an SRS resource, the control signaling instructing the UE to transmit an SRS via the SRS resource. The CSI-RS component 630 is capable of, configured to, or operable to support a means for receiving, via the CSI-RS resource, a CSI-RS. The SRS component 635 is capable of, configured to, or operable to support a means for transmitting, via the SRS resource, the SRS that is precoded based on predicted CSI for a wireless channel resource that occurs in time after the SRS resource, where the predicted CSI is based on the CSI-RS.

In some examples, the control signaling indicates a differential value indicating a time after the SRS resource at which the UE is to predict CSI.

In some examples, to support receiving the control signaling, the control signaling component 625 is capable of, configured to, or operable to support a means for receiving RRC signaling indicating a set of multiple differential values, each of the set of multiple differential values indicating a respective time after the SRS resource at which the UE is to predict CSI.

In some examples, the control signaling component 625 is capable of, configured to, or operable to support a means for receiving a MAC-CE or DCI indicating activation of one of the set of multiple differential values.

In some examples, the CSI prediction component 640 is capable of, configured to, or operable to support a means for receiving a request to indicate a capability of the UE to support CSI prediction. In some examples, the CSI prediction component 640 is capable of, configured to, or operable to support a means for transmitting a capability message indicating the capability of the UE to support the CSI prediction based on the request.

In some examples, the capability message includes an indication of a maximum duration of time after the SRS resource at which the UE is to predict CSI, a quantity of time durations for which the UE is to predict the CSI, or any combination thereof.

In some examples, to support transmitting the SRS, the SRS component 635 is capable of, configured to, or operable to support a means for transmitting the SRS that is precoded according to the predicted CSI that is predicted at a first time after the SRS resource, and a second SRS that is precoded according to the predicted CSI that is predicted at a second time after the SRS resource.

In some examples, the SRS component 635 is capable of, configured to, or operable to support a means for transmitting an indication of the first time and the second time after the SRS resource.

In some examples, the differential value component 645 is capable of, configured to, or operable to support a means for transmitting a control message indicating one or more differential values, where each of the one or more differential values indicates a respective time after the SRS resource at which the UE is to predict CSI. In some examples, each of the one or more differential values corresponds to a respective SRS.

In some examples, where the SRS is precoded based on the predicted CSI corresponding to a time associated with the one or more differential values. In some examples, the control signaling instructs the UE to precode the SRS based on the predicted CSI.

Figure 7:
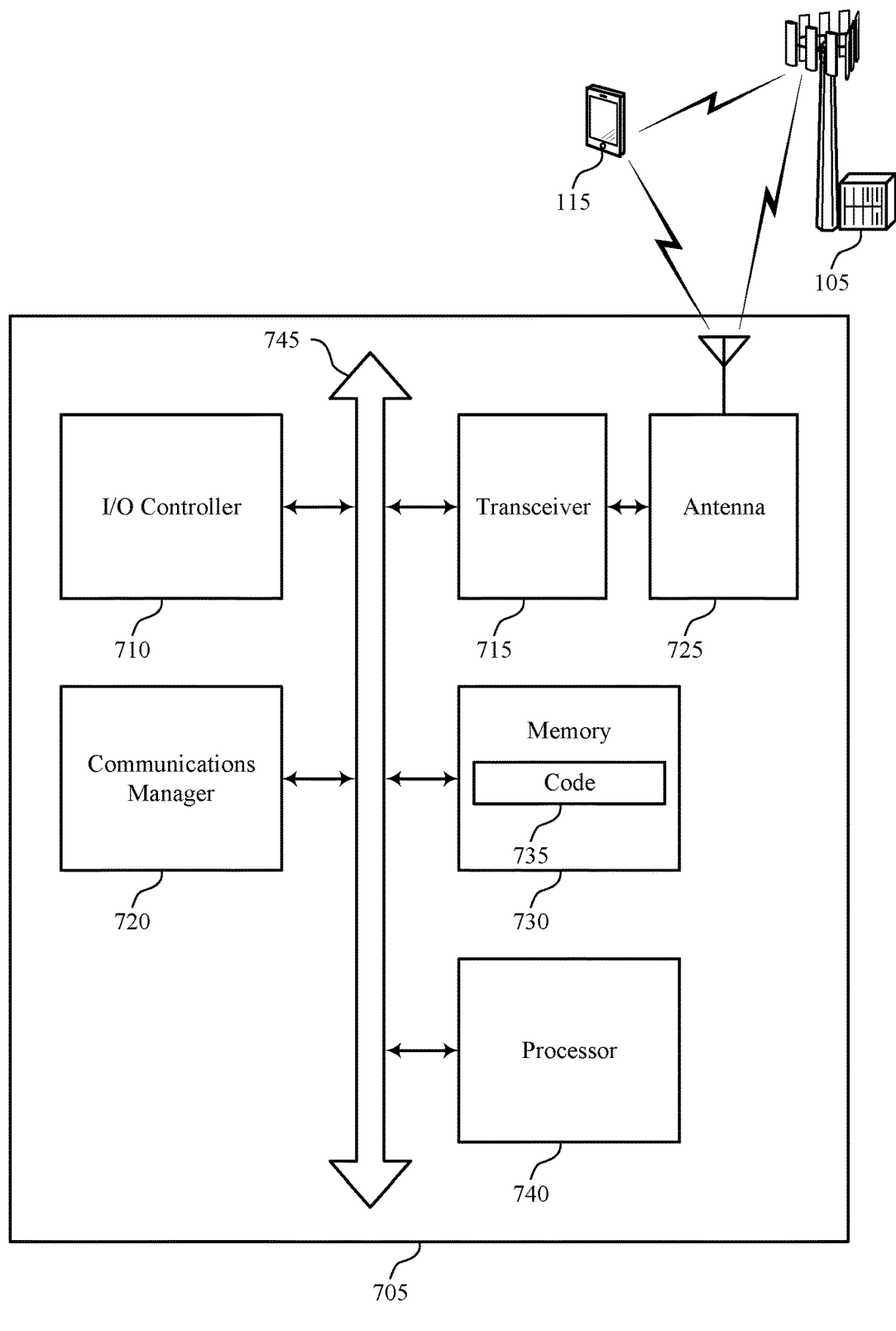
FIG. 7 shows a diagram of a system including a device that supports non-codebook-based precoding based on downlink channel predictions in accordance with one or more aspects of the present disclosure.

FIG. 7 shows a diagram of a system 700 including a device 705 that supports non-codebook-based precoding based on downlink channel predictions in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting non-codebook-based precoding based on downlink channel predictions). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein.

The communications manager 720 may support wireless communications at a UE in accordance with examples as disclosed herein. For example, the communications manager 720 is capable of, configured to, or operable to support a means for receiving control signaling indicating a CSI-RS resource and an SRS resource, the control signaling instructing the UE to transmit an SRS via the SRS resource. The communications manager 720 is capable of, configured to, or operable to support a means for receiving, via the CSI-RS resource, a CSI-RS. The communications manager 720 is capable of, configured to, or operable to support a means for transmitting, via the SRS resource, the SRS that is precoded based on predicted CSI for a wireless channel resource that occurs in time after the SRS resource, where the predicted CSI is based on the CSI-RS.

By including or configuring the communications manager 720 in accordance with examples as described herein, the device 705 may support techniques for non-codebook-based precoding based on downlink channel predictions, which may result in more efficient utilization of communication resources, improved accuracy of estimated channels, improved communications between wireless devices, and reduced latency In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of non-codebook-based precoding based on downlink channel predictions as described herein, or the at least one processor 740 and the at least one memory 730 may be otherwise configured to, individually or collectively, perform or support such operations.

Figure 8:
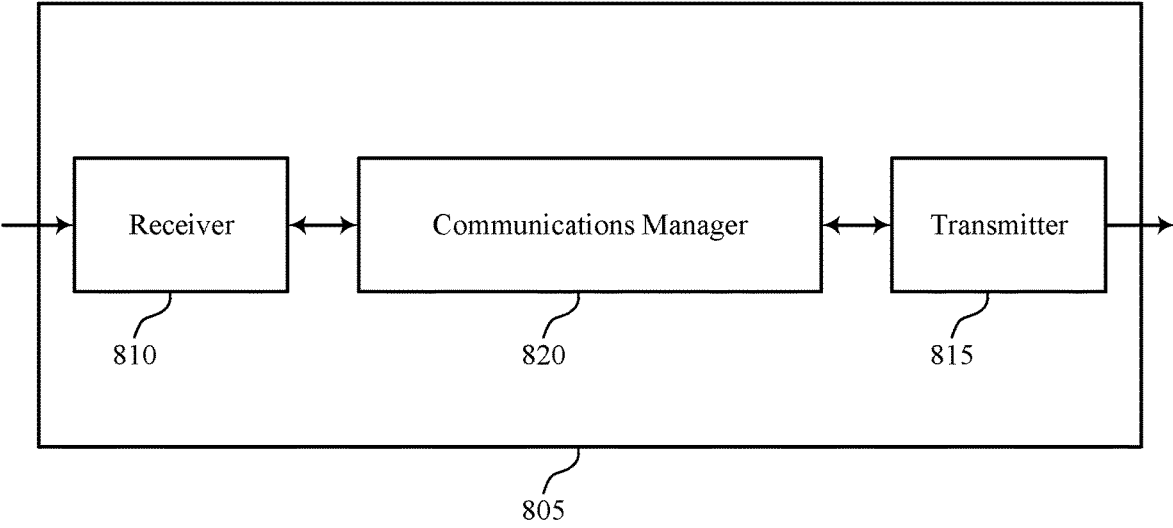
FIGS. 8 and 9 show block diagrams of devices that support non-codebook-based precoding based on downlink channel predictions in accordance with one or more aspects of the present disclosure.

FIG. 8 shows a block diagram 800 of a device 805 that supports non-codebook-based precoding based on downlink channel predictions in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of non-codebook-based precoding based on downlink channel predictions as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 is capable of, configured to, or operable to support a means for transmitting control signaling indicating a CSI-RS resource and an SRS resource, the control signaling instructing a UE to transmit an SRS via the SRS resource. The communications manager 820 is capable of, configured to, or operable to support a means for transmitting, via the CSI-RS resource, a CSI-RS. The communications manager 820 is capable of, configured to, or operable to support a means for receiving, via the SRS resource, the SRS that is precoded based on predicted CSI for a wireless channel resource that occurs in time after the SRS resource, where the predicted CSI is based on the CSI-RS.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for non-codebook-based precoding based on downlink channel predictions, which may result in more efficient utilization of communication resources, improved accuracy of estimated channels, improved communications between wireless devices, and reduced latency.

Figure 9:
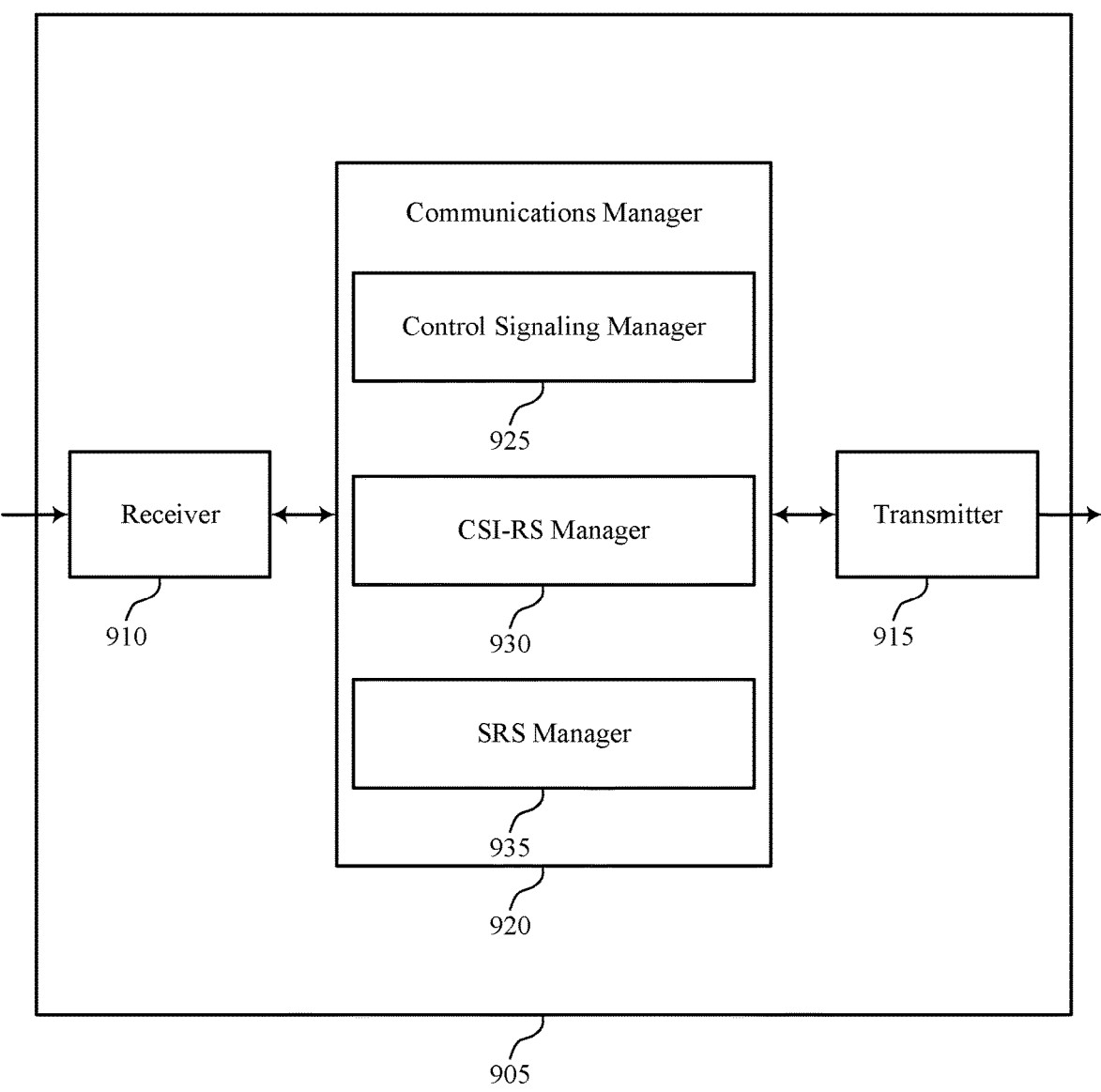

FIG. 9 shows a block diagram 900 of a device 905 that supports non-codebook-based precoding based on downlink channel predictions in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of non-codebook-based precoding based on downlink channel predictions as described herein. For example, the communications manager 920 may include a control signaling manager 925, a CSI-RS manager 930, an SRS manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The control signaling manager 925 is capable of, configured to, or operable to support a means for transmitting control signaling indicating a CSI-RS resource and an SRS resource, the control signaling instructing a UE to transmit an SRS via the SRS resource. The CSI-RS manager 930 is capable of, configured to, or operable to support a means for transmitting, via the CSI-RS resource, a CSI-RS. The SRS manager 935 is capable of, configured to, or operable to support a means for receiving, via the SRS resource, the SRS that is precoded based on predicted CSI for a wireless channel resource that occurs in time after the SRS resource, where the predicted CSI is based on the CSI-RS.

Figure 10:
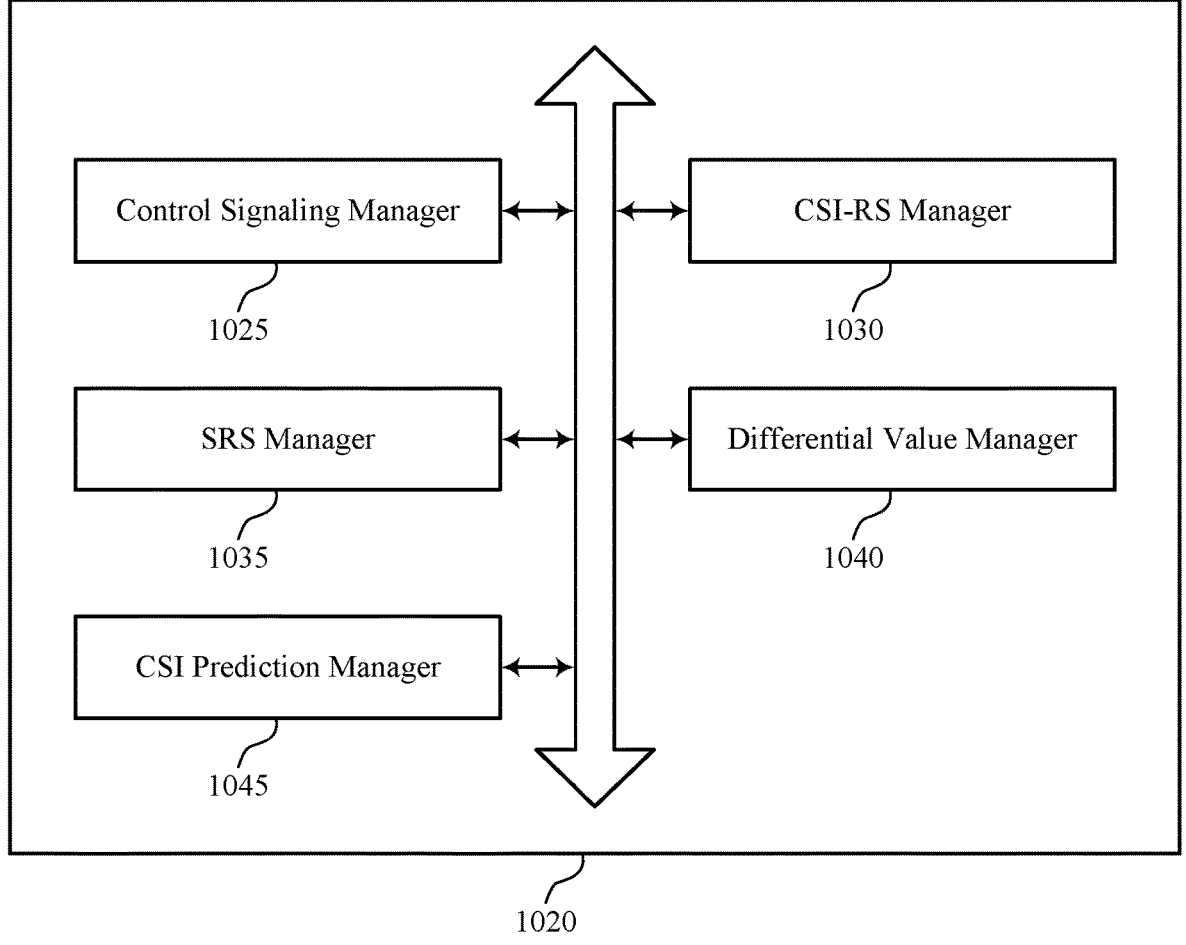
FIG. 10 shows a block diagram of a communications manager that supports non-codebook-based precoding based on downlink channel predictions in accordance with one or more aspects of the present disclosure.

FIG. 10 shows a block diagram 1000 of a communications manager 1020 that supports non-codebook-based precoding based on downlink channel predictions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of non-codebook-based precoding based on downlink channel predictions as described herein. For example, the communications manager 1020 may include a control signaling manager 1025, a CSI-RS manager 1030, an SRS manager 1035, a CSI prediction manager 1040, a differential value manager 1045, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The control signaling manager 1025 is capable of, configured to, or operable to support a means for transmitting control signaling indicating a CSI-RS resource and an SRS resource, the control signaling instructing a UE to transmit an SRS via the SRS resource. The CSI-RS manager 1030 is capable of, configured to, or operable to support a means for transmitting, via the CSI-RS resource, a CSI-RS. The SRS manager 1035 is capable of, configured to, or operable to support a means for receiving, via the SRS resource, the SRS that is precoded based on predicted CSI for a wireless channel resource that occurs in time after the SRS resource, where the predicted CSI is based on the CSI-RS.

In some examples, the control signaling indicates a differential value indicating a time after the SRS resource at which the UE is to predict CSI.

In some examples, to support transmitting the control signaling, the control signaling manager 1025 is capable of, configured to, or operable to support a means for transmitting RRC signaling indicating a set of multiple differential values, each of the set of multiple differential values indicating a respective time after the SRS resource at which the UE is to predict CSI.

In some examples, the control signaling manager 1025 is capable of, configured to, or operable to support a means for transmitting MAC-CE or DCI indicating activation of one of the set of multiple differential values.

In some examples, the CSI prediction manager 1040 is capable of, configured to, or operable to support a means for transmitting a request to indicate a capability of the UE to support CSI prediction. In some examples, the CSI prediction manager 1040 is capable of, configured to, or operable to support a means for receiving a capability message indicating the capability of the UE to support the CSI prediction based on the request.

In some examples, the capability message includes an indication of a maximum duration of time after the SRS resource at which the UE is to predict CSI, a quantity of time durations at which the UE is to predict the CSI, or any combination thereof.

In some examples, to support receiving the SRS, the SRS manager 1035 is capable of, configured to, or operable to support a means for receiving the SRS that is precoded according to the predicted CSI that is predicted at a first time after the SRS resource, and a second SRS that is precoded according to the predicted CSI that is predicted at a second time after the SRS resource.

In some examples, the SRS manager 1035 is capable of, configured to, or operable to support a means for receiving an indication of the first time and the second time after the SRS resource at which CSI is predicted.

In some examples, the differential value manager 1045 is capable of, configured to, or operable to support a means for receiving a control message indicating one or more differential values, where each of the one or more differential values indicates a respective time after the SRS resource at which the UE is to predict CSI. In some examples, each for the one or more differential values corresponds to a respective SRS.

In some examples, where the SRS is precoded based on the predicted CSI corresponding to a time associated with the one or more differential values. In some examples, the control signaling instructs the UE to precode the SRS based on the predicted CSI.

Figure 11:
FIG. 11 shows a diagram of a system including a device that supports non-codebook-based precoding based on downlink channel predictions in accordance with one or more aspects of the present disclosure.

FIG. 11 shows a diagram of a system 1100 including a device 1105 that supports non-codebook-based precoding based on downlink channel predictions in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting non-codebook-based precoding based on downlink channel predictions). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some implementations, the at least one processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the at least one processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 is capable of, configured to, or operable to support a means for transmitting control signaling indicating a CSI-RS resource and an SRS resource, the control signaling instructing a UE to transmit an SRS via the SRS resource. The communications manager 1120 is capable of, configured to, or operable to support a means for transmitting, via the CSI-RS resource, a CSI-RS. The communications manager 1120 is capable of, configured to, or operable to support a means for receiving, via the SRS resource, the SRS that is precoded based on predicted CSI for a wireless channel resource that occurs in time after the SRS resource, where the predicted CSI is based on the CSI-RS.

By including or configuring the communications manager 1120 in accordance with examples as described herein, the device 1105 may support techniques for non-codebook-based precoding based on downlink channel predictions, which may result in more efficient utilization of communication resources, improved accuracy of estimated channels, improved communications between wireless devices, and reduced latency.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of non-codebook-based precoding based on downlink channel predictions as described herein, or the at least one processor 1135 and the at least one memory 1125 may be otherwise configured to, individually or collectively, perform or support such operations.

FIG. 12 shows a flowchart illustrating a method 1200 that supports non-codebook-based precoding based on downlink channel predictions in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving control signaling indicating a CSI-RS resource and an SRS resource, the control signaling instructing the UE to transmit an SRS via the SRS resource. The operations of 1205 may be performed in accordance with examples as disclosed herein. In some examples, aspects of the operations of 1205 may be performed by a control signaling component 625 as described with reference to FIG. 6.

At 1210, the method may include receiving, via the CSI-RS resource, a CSI-RS. The operations of 1210 may be performed in accordance with examples as disclosed herein. In some examples, aspects of the operations of 1210 may be performed by a CSI-RS component 630 as described with reference to FIG. 6.

At 1215, the method may include transmitting, via the SRS resource, the SRS that is precoded based on predicted CSI for a wireless channel resource that occurs in time after the SRS resource, where the predicted CSI is based on the CSI-RS. The operations of 1215 may be performed in accordance with examples as disclosed herein. In some examples, aspects of the operations of 1215 may be performed by an SRS component 635 as described with reference to FIG. 6.

FIG. 13 shows a flowchart illustrating a method 1300 that supports non-codebook-based precoding based on downlink channel predictions in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a CSI-RS resource and an SRS resource, the control signaling instructing the UE to transmit an SRS via the SRS resource. The operations of 1305 may be performed in accordance with examples as disclosed herein. In some examples, aspects of the operations of 1305 may be performed by a control signaling component 625 as described with reference to FIG. 6.

At 1310, the method may include receiving, via the CSI-RS resource, a CSI-RS. The operations of 1310 may be performed in accordance with examples as disclosed herein. In some examples, aspects of the operations of 1310 may be performed by a CSI-RS component 630 as described with reference to FIG. 6.

At 1315, the method may include receiving RRC signaling indicating a set of multiple differential values, each of the set of multiple differential values indicating a respective time after the SRS resource at which the UE is to predict CSI. The operations of 1315 may be performed in accordance with examples as disclosed herein. In some examples, aspects of the operations of 1315 may be performed by a control signaling component 625 as described with reference to FIG. 6.

At 1320, the method may include transmitting, via the SRS resource, the SRS that is precoded based on predicted CSI for a wireless channel resource that occurs in time after the SRS resource, where the predicted CSI is based on the CSI-RS. The operations of 1320 may be performed in accordance with examples as disclosed herein. In some examples, aspects of the operations of 1320 may be performed by an SRS component 635 as described with reference to FIG. 6.

FIG. 14 shows a flowchart illustrating a method 1400 that supports non-codebook-based precoding based on downlink channel predictions in accordance with aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting control signaling indicating a CSI-RS resource and an SRS resource, the control signaling instructing a UE to transmit an SRS via the SRS resource. The operations of 1405 may be performed in accordance with examples as disclosed herein. In some examples, aspects of the operations of 1405 may be performed by a control signaling manager 1025 as described with reference to FIG. 10.

At 1410, the method may include transmitting, via the CSI-RS resource, a CSI-RS. The operations of 1410 may be performed in accordance with examples as disclosed herein. In some examples, aspects of the operations of 1410 may be performed by a CSI-RS manager 1030 as described with reference to FIG. 10.

At 1415, the method may include receiving, via the SRS resource, the SRS that is precoded based on predicted CSI for a wireless channel resource that occurs in time after the SRS resource, where the predicted CSI is based on the CSI-RS. The operations of 1415 may be performed in accordance with examples as disclosed herein. In some examples, aspects of the operations of 1415 may be performed by an SRS manager 1035 as described with reference to FIG. 10.

FIG. 15 shows a flowchart illustrating a method 1500 that supports non-codebook-based precoding based on downlink channel predictions in accordance with aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling indicating a CSI-RS resource and an SRS resource, the control signaling instructing a UE to transmit an SRS via the SRS resource. The operations of 1505 may be performed in accordance with examples as disclosed herein. In some examples, aspects of the operations of 1505 may be performed by a control signaling manager 1025 as described with reference to FIG. 10.

At 1510, the method may include transmitting, via the CSI-RS resource, a CSI-RS. The operations of 1510 may be performed in accordance with examples as disclosed herein. In some examples, aspects of the operations of 1510 may be performed by a CSI-RS manager 1030 as described with reference to FIG. 10.

At 1515, the method may include transmitting RRC signaling indicating a set of multiple differential values, each of the set of multiple differential values indicating a respective time after the SRS resource at which the UE is to predict CSI. The operations of 1515 may be performed in accordance with examples as disclosed herein. In some examples, aspects of the operations of 1515 may be performed by a control signaling manager 1025 as described with reference to FIG. 10.

At 1520, the method may include receiving, via the SRS resource, the SRS that is precoded based on predicted CSI for a wireless channel resource that occurs in time after the SRS resource, where the predicted CSI is based on the CSI-RS. The operations of 1520 may be performed in accordance with examples as disclosed herein. In some examples, aspects of the operations of 1520 may be performed by an SRS manager 1035 as described with reference to FIG. 10.

The following provides an overview of aspects of the present disclosure:

Aspect 1: A method for wireless communications at a UE, comprising: receiving control signaling indicating a CSI-RS resource and a SRS resource, the control signaling instructing the UE to transmit a SRS via the SRS resource; receiving, via the CSI-RS resource, a CSI-RS; and transmitting, via the SRS resource, the SRS that is precoded based at least in part on predicted CSI for a wireless channel resource that occurs in time after the SRS resource, wherein the predicted CSI is based at least in part on the CSI-RS.

Aspect 2: The method of aspect 1, wherein the control signaling indicates a differential value indicating a time after the SRS resource at which the UE is to predict CSI.

Aspect 3: The method of any of aspects 1 through 2, wherein receiving the control signaling comprises: receiving RRC signaling indicating a plurality of differential values, each of the plurality of differential values indicating a respective time after the SRS resource at which the UE is to predict CSI.

Aspect 4: The method of aspect 3, further comprising: receiving a MAC-CE or DCI indicating activation of one of the plurality of differential values.

Aspect 5: The method of any of aspects 1 through 4, further comprising: receiving a request to indicate a capability of the UE to support CSI prediction; and transmitting a capability message indicating the capability of the UE to support the CSI prediction based at least in part on the request.

Aspect 6: The method of aspect 5, wherein the capability message includes an indication of a maximum duration of time after the SRS resource at which the UE is to predict CSI, a quantity of time durations for which the UE is to predict the CSI, or any combination thereof.

Aspect 7: The method of any of aspects 1 through 6, wherein transmitting the SRS comprises: transmitting the SRS that is precoded according to the predicted CSI that is predicted at a first time after the SRS resource, and a second SRS that is precoded according to the predicted CSI that is predicted at a second time after the SRS resource.

Aspect 8: The method of aspect 7, further comprising: transmitting an indication of the first time and the second time after the SRS resource.

Aspect 9: The method of any of aspects 1 through 8, further comprising: transmitting a control message indicating one or more differential values, wherein each of the one or more differential values indicates a respective time after the SRS resource at which the UE is to predict CSI, and wherein each of the one or more differential values corresponds to a respective SRS.

Aspect 10: The method of aspect 9, wherein the one or more differential values are based at least in part on a time at which transmission of the SRS is scheduled, and wherein the SRS is precoded based at least in part on the predicted CSI corresponding to a time associated with the one or more differential values Aspect 11: The method of any of aspects 1 through 10, wherein the control signaling instructs the UE to precode the SRS based at least in part on the predicted CSI.

Aspect 12: A method for wireless communications at a network entity, comprising: transmitting control signaling indicating a CSI-RS resource and a SRS resource, the control signaling instructing a UE to transmit a SRS via the SRS resource; transmitting, via the CSI-RS resource, a CSI-RS; and receiving, via the SRS resource, the SRS that is precoded based at least in part on predicted CSI for a wireless channel resource that occurs in time after the SRS resource, wherein the predicted CSI is based at least in part on the CSI-RS.

Aspect 13: The method of aspect 12, wherein the control signaling indicates a differential value indicating a time after the SRS resource at which the UE is to predict CSI.

Aspect 14: The method of any of aspects 12 through 13, wherein transmitting the control signaling comprises: transmitting RRC signaling indicating a plurality of differential values, each of the plurality of differential values indicating a respective time after the SRS resource at which the UE is to predict CSI.

Aspect 15: The method of aspect 14, further comprising: transmitting a MAC-CE or DCI indicating activation of one of the plurality of differential values.

Aspect 16: The method of any of aspects 12 through 15, further comprising: transmitting a request to indicate a capability of the UE to support CSI prediction; and receiving a capability message indicating the capability of the UE to support the CSI prediction based at least in part on the request.

Aspect 17: The method of aspect 16, wherein the capability message includes an indication of a maximum duration of time after the SRS resource at which the UE is to predict CSI, a quantity of time durations at which the UE is to predict the CSI, or any combination thereof.

Aspect 18: The method of any of aspects 12 through 17, wherein receiving the SRS comprises: receiving the SRS that is precoded according to the predicted CSI that is predicted at a first time after the SRS resource, and a second SRS that is precoded according to the predicted CSI that is predicted at a second time after the SRS resource.

Aspect 19: The method of aspect 18, further comprising: receiving an indication of the first time and the second time after the SRS resource at which CSI is predicted.

Aspect 20: The method of any of aspects 12 through 19, further comprising: receiving a control message indicating one or more differential values, wherein each of the one or more differential values indicates a respective time after the SRS resource at which the UE is to predict CSI, and wherein each for the one or more differential values corresponds to a respective SRS.

Aspect 21: The method of aspect 20, wherein the one or more differential values are based at least in part on a time at which transmission of the SRS is scheduled, and wherein the SRS is precoded based at least in part on the predicted CSI corresponding to a time associated with the one or more differential values Aspect 22: The method of any of aspects 12 through 21, wherein the control signaling instructs the UE to precode the SRS based at least in part on the predicted CSI.

Aspect 23: A UE for wireless communications, comprising one or more memories storing processor-executable code, and one or more processors coupled with the one or more memories and individually or collectively operable to execute the code to cause the UE to perform a method of any of aspects 1 through 11.

Aspect 24: A UE for wireless communications, comprising at least one means for performing a method of any of aspects 1 through 11.

Aspect 25: A non-transitory computer-readable medium storing code for wireless communications, the code comprising instructions executable by a processor to perform a method of any of aspects 1 through 11.

Aspect 26: A network entity for wireless communications, comprising one or more memories storing processor-executable code, and one or more processors coupled with the one or more memories and individually or collectively operable to execute the code to cause the network entity to perform a method of any of aspects 12 through 22.

Aspect 27: A network entity for wireless communications, comprising at least one means for performing a method of any of aspects 12 through 22.

Aspect 28: A non-transitory computer-readable medium storing code for wireless communications, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive control signaling indicating a channel state information reference signal resource and a sounding reference signal resource, the control signaling instructing the UE to transmit a sounding reference signal via the sounding reference signal resource;
receive, via the channel state information reference signal resource, a channel state information reference signal;
transmit, via the sounding reference signal resource, the sounding reference signal that is precoded based at least in part on predicted channel state information for a wireless channel resource that occurs in time after the sounding reference signal resource, wherein the predicted channel state information is based at least in part on the channel state information reference signal; and
transmit a control message indicating one or more differential values, wherein each of the one or more differential values indicates a respective time after the sounding reference signal resource at which the UE is to predict channel state information, and wherein each of the one or more differential values correspond to a respective sounding reference signal.

2. The UE of claim 1, wherein the one or more processors are individually or collectively further operable to execute the code to cause the UE to:
receive a request to indicate a capability of the UE to support channel state information prediction; and
transmit a capability message indicating the capability of the UE to support the channel state information prediction based at least in part on the request.

3. The UE of claim 2, wherein the capability message includes an indication of a maximum duration of time after the sounding reference signal resource at which the UE is to predict channel state information, a quantity of time durations for which the UE is to predict the channel state information, or any combination thereof.

4. The UE of claim 1, wherein, to transmit the sounding reference signal, the one or more processors are individually or collectively operable to execute the code to cause the UE to:
transmit the sounding reference signal that is precoded according to the predicted channel state information that is predicted at a first time after the sounding reference signal resource, and a second sounding reference signal that is precoded according to the predicted channel state information that is predicted at a second time after the sounding reference signal resource.

5. The UE of claim 4, wherein the one or more processors are individually or collectively further operable to execute the code to cause the UE to:
transmit an indication of the first time and the second time after the sounding reference signal resource.

6. The UE of claim 1, wherein the sounding reference signal is precoded based at least in part on the predicted channel state information corresponding to a time associated with the one or more differential values.

7. The UE of claim 1, wherein the control signaling instructs the UE to precode the sounding reference signal based at least in part on the predicted channel state information.

8. A network entity, comprising:

one or more memories storing processor-executable code; and one or more processors coupled with the one or more memories and individually or collectively operable to execute the code to cause the network entity to:

transmit control signaling indicating a channel state information reference signal resource and a sounding reference signal resource, the control signaling instructing a user equipment (UE) to transmit a sounding reference signal via the sounding reference signal resource;

transmit, via the channel state information reference signal resource, a channel state information reference signal;

receive, via the sounding reference signal resource, the sounding reference signal that is precoded based at least in part on predicted channel state information for a wireless channel resource that occurs in time after the sounding reference signal resource, wherein the predicted channel state information is based at least in part on the channel state information reference signal; and receive a control message indicating one or more differential values, wherein each of the one or more differential values indicates a respective time after the sounding reference signal resource at which the UE is to predict channel state information, and wherein each for the one or more differential values correspond to a respective sounding reference signal.

9. The network entity of claim 8, wherein the one or more processors are individually or collectively further operable to execute the code to cause the network entity to:

transmit a request to indicate a capability of the UE to support channel state information prediction; and receive a capability message indicating the capability of the UE to support the channel state information prediction based at least in part on the request.

10. The network entity of claim 9, wherein the capability message includes an indication of a maximum duration of time after the sounding reference signal resource at which the UE is to predict channel state information, a quantity of time durations at which the UE is to predict the channel state information, or any combination thereof.

11. The network entity of claim 8, wherein, to receive the sounding reference signal, the one or more processors are individually or collectively operable to execute the code to cause the network entity to:

receive the sounding reference signal that is precoded according to the predicted channel state information that is predicted at a first time after the sounding reference signal resource, and a second sounding reference signal that is precoded according to the predicted channel state information that is predicted at a second time after the sounding reference signal resource.

12. The network entity of claim 11, wherein the one or more processors are individually or collectively further operable to execute the code to cause the network entity to:

receive an indication of the first time and the second time after the sounding reference signal resource at which channel state information is predicted.

13. The network entity of claim 8, wherein the sounding reference signal is precoded based at least in part on the predicted channel state information corresponding to a time associated with the one or more differential values.

14. The network entity of claim 8, wherein the control signaling instructs the UE to precode the sounding reference signal based at least in part on the predicted channel state information.

15. A method for wireless communications at a user equipment (UE), comprising:

receiving control signaling indicating a channel state information reference signal resource and a sounding reference signal resource, the control signaling instructing the UE to transmit a sounding reference signal via the sounding reference signal resource;

receiving, via the channel state information reference signal resource, a channel state information reference signal;

transmitting, via the sounding reference signal resource, the sounding reference signal that is precoded based at least in part on predicted channel state information for a wireless channel resource that occurs in time after the sounding reference signal resource, wherein the predicted channel state information is based at least in part on the channel state information reference signal; and transmitting a control message indicating one or more differential values, wherein each of the one or more differential values indicates a respective time after the sounding reference signal resource at which the UE is to predict channel state information, and wherein each of the one or more differential values correspond to a respective sounding reference signal.

16. A method for wireless communications at a network entity, comprising:

transmitting control signaling indicating a channel state information reference signal resource and a sounding reference signal resource, the control signaling instructing a user equipment (UE) to transmit a sounding reference signal via the sounding reference signal resource;

transmitting, via the channel state information reference signal resource, a channel state information reference signal;

receiving, via the sounding reference signal resource, the sounding reference signal that is precoded based at least in part on predicted channel state information for a wireless channel resource that occurs in time after the sounding reference signal resource, wherein the predicted channel state information is based at least in part on the channel state information reference signal; and receiving a control message indicating one or more differential values, wherein each of the one or more differential values indicates a respective time after the sounding reference signal resource at which the UE is to predict channel state information, and wherein each for the one or more differential values correspond to a respective sounding reference signal.

17. The method of claim 15, further comprising:

receiving a request to indicate a capability of the UE to support channel state information prediction; and transmitting a capability message indicating the capability of the UE to support the channel state information prediction based at least in part on the request.

18. The method of claim 17, wherein the capability message includes an indication of a maximum duration of time after the sounding reference signal resource at which the UE is to predict channel state information, a quantity of time durations for which the UE is to predict the channel state information, or any combination thereof.

19. The method of claim 15, wherein, transmitting the sounding reference signal includes:

transmitting the sounding reference signal that is precoded according to the predicted channel state information that is predicted at a first time after the sounding reference signal resource, and a second sounding reference signal that is precoded according to the predicted channel state information that is predicted at a second time after the sounding reference signal resource.

20. The method of claim 19, further comprising:

transmitting an indication of the first time and the second time after the sounding reference signal resource.

21. The method of claim 15, wherein the sounding reference signal is precoded based at least in part on the predicted channel state information corresponding to a time associated with the one or more differential values.

22. The method of claim 15, wherein the control signaling instructs the UE to precode the sounding reference signal based at least in part on the predicted channel state information.

23. The method of claim 16, further comprising:

transmitting a request to indicate a capability of the UE to support channel state information prediction; and receiving a capability message indicating the capability of the UE to support the channel state information prediction based at least in part on the request.

24. The method of claim 23, wherein the capability message includes an indication of a maximum duration of time after the sounding reference signal resource at which the UE is to predict channel state information, a quantity of time durations at which the UE is to predict the channel state information, or any combination thereof.

25. The method of claim 16, wherein receiving the sounding reference signal includes:

receiving the sounding reference signal that is precoded according to the predicted channel state information that is predicted at a first time after the sounding reference signal resource, and a second sounding reference signal that is precoded according to the predicted channel state information that is predicted at a second time after the sounding reference signal resource.

26. The method of claim 25, further comprising:

receive an indication of the first time and the second time after the sounding reference signal resource at which channel state information is predicted.

27. The method of claim 16, wherein the sounding reference signal is precoded based at least in part on the predicted channel state information corresponding to a time associated with the one or more differential values.

28. The method of claim 16, wherein the control signaling instructs the UE to precode the sounding reference signal based at least in part on the predicted channel state information.

* * * * *